US006731299B2

(12) United States Patent
Wang et al.

(10) Patent No.: US 6,731,299 B2
(45) Date of Patent: May 4, 2004

(54) APPARATUS AND METHOD FOR DITHERING IN IMAGE PROCESSING AND COMPUTER GRAPHICS SYSTEMS

(75) Inventors: Hai-Wei Wang, Pingtung (TW); Chung-Yen Lu, Taipei (TW)

(73) Assignee: Silicon Integrated Systems Corp. (TW)

( * ) Notice: Subject to any disclaimer, the term of this patent is extended or adjusted under 35 U.S.C. 154(b) by 176 days.

(21) Appl. No.: 09/964,808

(22) Filed: Sep. 28, 2001

(65) Prior Publication Data

US 2003/0063100 A1 Apr. 3, 2003

(51) Int. Cl.[7] .................................................. G09G 5/02
(52) U.S. Cl. ....................... 345/596; 345/593; 345/600; 345/605
(58) Field of Search ................................ 345/605, 593, 345/596, 600

(56) References Cited

U.S. PATENT DOCUMENTS

| 5,649,083 | A | * | 7/1997 | Barkans et al. ............. 345/597 |
| 5,798,767 | A | * | 8/1998 | Poole et al. ................. 345/604 |
| 5,877,754 | A | * | 3/1999 | Keith et al. ................. 345/601 |
| 6,052,113 | A | * | 4/2000 | Foster ........................ 345/596 |
| 6,559,857 | B2 | * | 5/2003 | Ali-Santosa et al. ........ 345/600 |
| 2002/0005854 | A1 | * | 1/2002 | Deering et al. ............. 345/596 |

* cited by examiner

Primary Examiner—Matthew C. Bella
Assistant Examiner—Po-Wei Chen
(74) Attorney, Agent, or Firm—Lowe Hauptman Gilman & Berner, LLP

(57) ABSTRACT

A method for converting N-bit image data of a digital image into M-bit image data, in which N−M=K, K>0, is disclosed. The method is adapted to be used for dithering in an image processing system or a computer graphic system. For example, an N-bit red color value of each pixel of the digital image can be converted into an M-bit red color value by this method with little or no color deviation. According to the method, a difference of the most significant n bits and the least significant n bits of the N-bit image data of a pixel is used as a preliminary criterion for color value conversion, in which n is preferably equal to K. An apparatus for converting N-bit image data of a digital image into M-bit image data, in which N−M=K, K>0, is also disclosed. The apparatus includes a subtraction operator for realizing the difference of the most significant n bits and the least significant n bits of the N-bit image data of the pixel.

19 Claims, 7 Drawing Sheets

D2 →

| i\j | 0 | 1 | 2 | 3 |
|---|---|---|---|---|
| 0 | 3 | 1 | 3 | 1 |
| 1 | 0 | 2 | 0 | 2 |
| 2 | 3 | 1 | 3 | 1 |
| 3 | 0 | 2 | 0 | 2 |

| i\j | 0 | 1 | 2 | 3 |
|---|---|---|---|---|
| 0 | 7 | 3 | 6 | 2 |
| 1 | 1 | 5 | 0 | 4 |
| 2 | 6 | 2 | 7 | 3 |
| 3 | 0 | 4 | 1 | 5 |

| i\j | 0 | 1 | 2 | 3 |
|---|---|---|---|---|
| 0 | 15 | 7 | 13 | 5 |
| 1 | 3 | 11 | 1 | 9 |
| 2 | 12 | 4 | 14 | 6 |
| 3 | 0 | 8 | 2 | 10 |

APPARATUS AND METHOD FOR DITHERING IN IMAGE PROCESSING AND COMPUTER GRAPHICS SYSTEMS

FIELD OF THE INVENTION

The present invention relates to a method for converting N-bit image data of a digital image into M-bit image data, in which N−M=K, K>0. More particularly, the present invention method is applied to a dithering process for computer graphics or image processing to solve the image deviation problem.

BACKGROUND OF THE INVENTION

Converting images from high precision into low precision is commonly used in computer graphics and image processing. As known, a processor is capable of processing an image with high precision data, a storage or display unit cooperating therewith, however, may be limited in low precision. This is because an image processor is designed to support various display standards, e.g., 24-bit true color format, and 16-bit high color format. Thus, it is often desirable to convert 24-bit data generated by the image processor to 16-bit data suitable for storing and/or displaying.

The 24-bit true color format takes 8-bit for representing the red color, 8-bit for representing the green color, and 8-bit for representing the blue color. On the other hand, the 16-bit high color format takes 5-bit, 6-bit and 5-bit for representing the red, green and blue colors, correspondingly. Therefore, when a pixel with true color format is converted into that with high color format, it needs to perform 8-to-5 and 8-to-6 conversions, as shown in FIG. 1.

Conventionally, truncation and rounding methods are used for such conversions. Simple truncation and rounding, however, are undesirable due to Mach banding effects that are introduced into the final image. Regarding the Mach banding effect, an intensity gap occurs at any edge where there is discontinuity in magnitude or slope of intensity, and it is exaggerated by the human eye. To avoid the Mach banding effect, a dithering process is developed to exploit spatial integration in the eye. In the dithering operation, a dither value from a dither matrix is combined with a color value prior to truncation. The dither value varies with pixel location in the image. FIGS. 2A~2C shows three examples of dither matrices or dither tables for 2-bit, 3-bit and 4-bit down conversions from m bits, respectively, in which i and j indicates the x- and y-coordinates of the pixel, and i=(x mod m), j=(y mod m).

By the use of the dither tables, random values are added to pixel intensities to break up contours, which are referred to as dither noise. Various algorithms have been used to generate the random distributions of the dither tables. By adding the dither noise over an entire picture, the intensity boundaries can be softened.

Please refer to FIG. 3 which is a schematic functional block diagram of a conventional dithering process for 8-to-5 conversion of a pixel, as applied to the red color conversion from a true color format to a high color format. First of all, the coordinate data of the pixel, i.e. x and y, are entered the functional block 31 to correspond to a value in the dither table D3 of FIG. 2B to determine a threshold value T. In the functional block 32, the threshold value T is compared with a value of the least significant 3 bits R[2:0] of the 8-bit color value R[7:0] of the pixel to realize a carry value. When the 3-bit color value R[2:0] is greater than the threshold value T, the carry value is 1, and the most significant 5 bits R[7:3] of the 8-bit color value of the pixel is added thereto the carry value 1 in the functional block 33 to form a temporary value denoted as Tmp[5:0]. On the contrary, when the 3-bit color value R[2:0] is less than or equal to the threshold value T, the most significant 5 bits R[7:3] of the 8-bit color value of the pixel is added thereto the carry value 0. That is, the temporary value Tmp[5:0] is equal to the unchanged most significant 5 bits R[7:3]. The temporary value Tmp[5:0] is further processed by a clamp operation in the functional block 34 to convert the temporary value Tmp[5:0] into the desired 5-bit color value R'[4:0] of the pixel. For the clamp operation, if the value of Tmp[5:0] is greater than 31, the dithered value R'[4:0] is set to be 31. Otherwise, the dithered value R'[4:0] is equal to the value of Tmp[5:0]. It is to be noted that Tmp[5:0] instead of Tmp[4:0] is used herein because the temporary value may overflow after the addition of the carry value.

FIG. 4 shows how the conventional dithering process similar to FIG. 3 performs 8-to-6 conversion of a pixel, as applied to the green color conversion from a true color format to a high color format. First of all, the coordinate data of the pixel, i.e. x and y, are entered the funvtional block 41 to correspond to a value in the dither table D2 of FIG. 2A to determine a threshold value T. The threshold value T is compared with a value of the least significant 2 bits G[1:0] of the 8-bit color value G[7:0] of the pixel in the functional block 42. When the 2-bit color value G[1:0] is greater than the threshold value T, the most significant 6 bits G[7:2] of the 8-bit color value of the pixel is added thereto a carry value of 1 in the functional block 43 to form a temporary value denoted as Tmp[6:0]. On the contrary, when the 2-bit color value G[1:0] is less than or equal to the threshold value T, the most significant 6 bits G[7:2] of the 8-bit color value of the pixel is added thereto a carry value of 0. That is, the temporary value Tmp[6:0] is equal to the unchanged most significant 6 bits G[7:2]. The temporary value Tmp[6:0] is further processed by a clamp operation in the functional block 44 to convert the temporary value Tmp[6:0] into the desired 6-bit color value G'[5:0] of the pixel. For the clamp operation, if the value of Tmp[6:0] is greater than 63, the dithered value G'[5:0] is set to be 63. Otherwise, the dithered value G'[5:0] is equal to the value of Tmp[6:0]. It is to be noted that Tmp[6:0] instead of Tmp[5:0] is used herein because the temporary value may overflow after the addition of the carry value.

On the contrary to the conversion illustrated with reference to FIG. 3 or 4, an inverse dithering operation is typically used for converting the image from the high color format to the true color format. A typical inverse dithering operation is to append several the most significant bits as illustrated in the functional block 51 or 52 of FIG. 5A or 5B. In FIG. 5A, the recovery value R"[7:0] is obtained by using the 5-bit color value R'[4:0] as the most significant 5 bits R"[7:3], and complementing the color value R"[7:0] by adding the most significant 3 bits R'[4:2] as the least significant 3 bits R"[2:0]. Likewise, in FIG. 5B, the recovery value G"[7:0] is obtained by using the 6-bit color value G'[5:0] as the most significant 6 bits G"[7:2], and complementing the color value G"[7:0] by adding the most significant 2 bits G'[5:4] as the least significant 2 bits G"[1:0].

The dithering method mentioned above achieves better visual quality than directly truncation for precision conversion. However, for computer graphics applications, a dithered image needs to be inversely dithered for further processing and then dithered again. A conventional inversely dithering method is to append the most significant bits into the dithered value for low to high precision conversion. Unfortunately, after repeating the dithering and inversely dithering processes several times, some points of the resulting image appear to become too red, too green or too blue. That is, a color deviation problem occurs.

Hereinafter, a color deviation problem caused by the conventional dithering method is illustrated. It is assumed that a pixel at a fixed position is to be dithered and inversely dithered several times, the number of intensity bits of the pixel is N, and the number of dropped bits is n. Due to the fixed position, a fixed threshold value T is derived from a dither table Dn. The original intensity of the pixel is $I_0$, the intensity of the pixel having been dithered k times is $I_k$, and the dithered value of the pixel after k times is $V_k$. Let $H_k$ be the value of the most significant n bits of $I_k$, namely, $H_k = \lfloor I_k/2^{N-n} \rfloor$. And let $P_k$ be the value of the least significant n bits of $I_k$, namely, $P_k = I_k \bmod 2^n$.

From the conventional inverse dithering method, $I_k = V_k * 8 + H_k$, that means, $P_k = H_k$. In the first dithering process, if $P_0$ is greater than T, then $V_1 = V_0 + 1$ and $I_1 = V_1 * 8 + H_1$. That is, $P_1 = H_1$. If $P_1$ is greater than T, then $V_2 = V_1 + 1$. It is easily to be proved that $H_k$ is greater than or equal to $H_1$. That means if $H_1$ is greater than T, then $H_k$ is greater than T and $P_k$ is also greater than T. When k increases, $I_k$ will increase, too. Finally, we will find some points with unharmonious colors, and color deviation is thus rendered.

SUMMARY OF THE INVENTION

Therefore, an object of the present invention is to provide a method and/or an apparatus for converting N-bit image data of a digital image into M-bit image data (N−M=K, K>0), by which the color deviation problem can be solved.

A first aspect of the present invention relates to a method for converting N-bit image data to a digital image into M-bit image data in a dithering process, in which N−M=K, K>0. The method includes steps of: performing a first operation for N-bit image data of a pixel of the digital image to realize a difference between the most significant n bits and the least significant n bits of the N-bit image data; performing a second operation for coordinate data of the pixel to realize a threshold value; comparing an absolute value of the difference with the threshold value; using the most significant M bits of the N-bit image data of the pixel as new image data of the pixel when the absolute value of the difference is no greater than the threshold value; adding a first unit value to the most significant M bits of the N-bit image data of the pixel to serve as new image data of the pixel when the absolute value of the difference is grater than the threshold value, and a sign of the difference value is positive; and subtracting a second unit value from the most significant M bits of the N-bit image data of the pixel to serve as new image data of the pixel when the absolute value of the difference is greater than the threshold value, and the sign of the difference value is negative. In this way, the N-bit image data of the pixel can be converted into M-bit image data.

Preferably, $1 \leq n \leq (N/2)$, and more preferably, n=K.

Preferably, the first unit value is equal to the second unit value, and each equals one.

Preferably, an additional step of comparing a sum of the most significant M bits of the N-bit image data and the first unit value with a value $(2^M - 1)$ involved. When the sum is greater than $(2^M - 1)$, the value $(2^M - 1)$ rather than the sum is used as new image data of the pixel.

Preferably, another step of comparing a difference of the most significant M bits of the N-bit image data and the second unit value with a value 0 involved. The value 0 rather than the difference will be used as new image data of the pixel if the difference is less than 0.

Preferably, the first operation includes a subtraction operation for to realize the difference. The second operation can be or include a dithering operation conventionally used in the art.

The image data of the pixel to be converted according to the present method can be red, green and blue color values of the pixel, each of which is individually converted by the method. Further, the above steps can be repeated for the other pixels of the digital image so as to complete conversion of the N-bit image data of the entire digital image into the M-bit image data.

A second aspect of the present invention relates to an apparatus for performing a dithering process to convert N-bit image data of a digital image into M-bit image data in which N−M=K, K>0. The apparatus includes a subtraction operator for subtracting the most significant n bits of the N-bit image data by least significant n bits of the N-bit image data to obtain a difference; a threshold operator for operating coordinate data of the pixel to obtain a threshold value; a comparing operator electrically connected to the subtraction operator and the threshold operator for comparing the difference with the threshold value, the comparing operator outputting a first control signal when an absolute value of the difference is no greater than the threshold value, a second control signal when the absolute value of the difference is greater than the threshold value, and a sign of the difference value is positive, and a third control signal when the absolute value of the difference is greater than the threshold value, and a sign of the difference value is negative and a computing operator electrically connected to the comparing operator for outputting the most significant M bits of the N-bit image data of the pixel as new image data of the pixel with M bits in response to the first control signal, outputting the most significant M bits plus a first unit value as new image data of the pixel in response to the second control signal, and outputting the most significant M bits minus a second unit value as new image data of the pixel in response to the third control signal. In this way, the N-bit image data of the pixel can be converted into M-bit image data.

Preferably, the apparatus further includes a clamp operator electrically connected to the computing operator. In the clamp operator, the new image data of the pixel is compared with a value $(2^M - 1)$ and a value 0. If the value of the new image data is greater than the value $(2^M - 1)$, a first adjusting operation will be performed. On the other hand, if the value of the new image data is less than the value 0, a second adjusting operation will be performed. In a preferred embodiment, the first adjusting operation is to substitute the value $(2^M - 1)$ for the compared M-bit image data to become new data of the pixel. The second adjusting operation is to substitute the value 0 for the compared M-bit image data to become new image data of the pixel.

Preferably, the threshold operator includes a dither table. The dither table is provided for the threshold operator to convert the coordinate data of the pixel into the threshold value by dithering. A conventional dither table and dithering process can be used herein.

BRIEF DESCRIPTION OF THE DRAWINGS

The present invention may best be understood through the following description with reference to the accompanying drawings, in which:

FIGS. 2A~2C shows three examples of dither matrices or dither tables for 2-bit, 3-bit and 4-bit drop conversions, i.e. D2, D3 and D4, respectively;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 6:
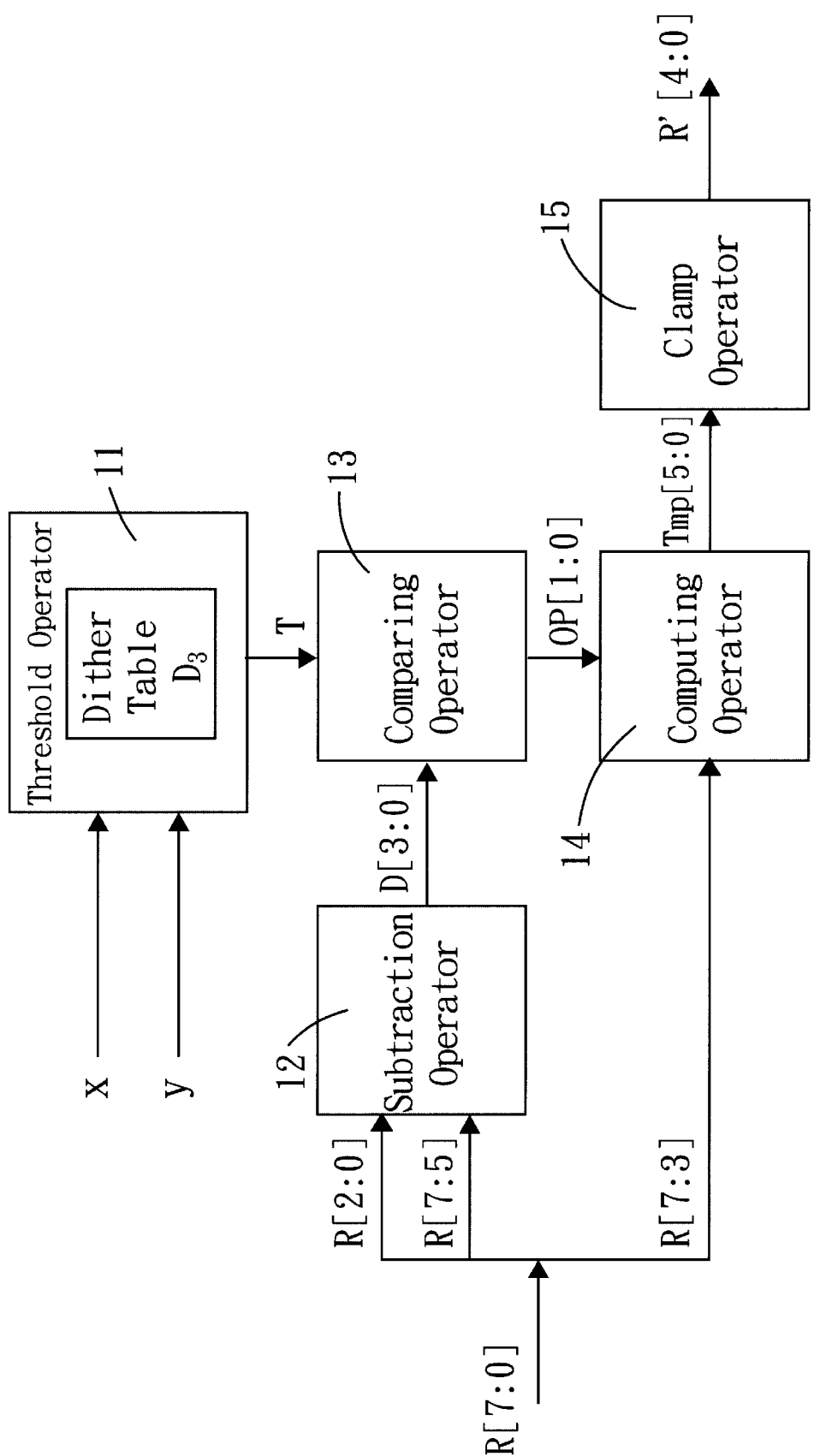
FIG. 6 is a preferred embodiment of an apparatus suitable for 8-to-5 conversion of a pixel according to the present invention, as applied to the red color conversion from a true color format to a high color format.

Please refer to FIG. 6 which is a preferred embodiment of an apparatus suitable for 8-to-5 conversion of a pixel according to the present invention, as applied to the red color conversion from a true color format to a high color format. The apparatus includes a subtraction operator 11, a threshold operator 12, a comparing operator 13, a computing operator 14 and a clamp operator 15. The threshold operator 12 includes a dither table D3 for 3-bit dropping conversion.

First of all, the coordinate data of the pixel, i.e. x and y, are entered into the threshold operator 12 to correspond to a value in the dither table D3 shown in FIG. 2B to determine a threshold value T. Meanwhile, the most significant 3 bits R[7:5] and least significant 3 bits R[2:0] of the pixel perform a subtraction operation to obtain a difference D[3:0]. A value of the difference D[3:0] is compared with the threshold value T in the comparing operator 13 to output an operation OP[1:0]. If the absolute value of the difference D[3:0] is less than or equal to the threshold value T, the value of the operation OP[1:0] will be 0, which means no change is needed. Otherwise, if the absolute value of the difference D[3:0] is greater than the threshold value T, the value of the operation OP[1:0] will be set depending on the sign of the difference D[3:0]. The value of the operation OP[1:0] is set to be 1 when the sign of the difference is positive. On the other hand, the value of the operation OP[1:0] is set to be 2 when the sign of the difference D[3:0] is negative. After the value of the operation OP[1:0] has been decided, a temporary value Tmp[5:0] is computed. The computation process is performed as the following formula:

$$Tmp[5:0] = \begin{cases} R[7:3] & \text{if } OP = 0 \\ R[7:3] + 1 & \text{if } OP = 1 \\ R[7:3] - 1 & \text{if } OP = 2 \end{cases}$$

The temporary value Tmp[5:0] is then entered into the clamp operator 15 to adjust the 5-bit color value according to the following equation:

$$R'[4:0] = \begin{cases} 31 & \text{if } Tmp[5:0] > 31 \\ 0 & \text{if } Tmp[5:0] < 0 \\ Tmp[5:0] & \text{otherwise} \end{cases}$$

Figure 1:
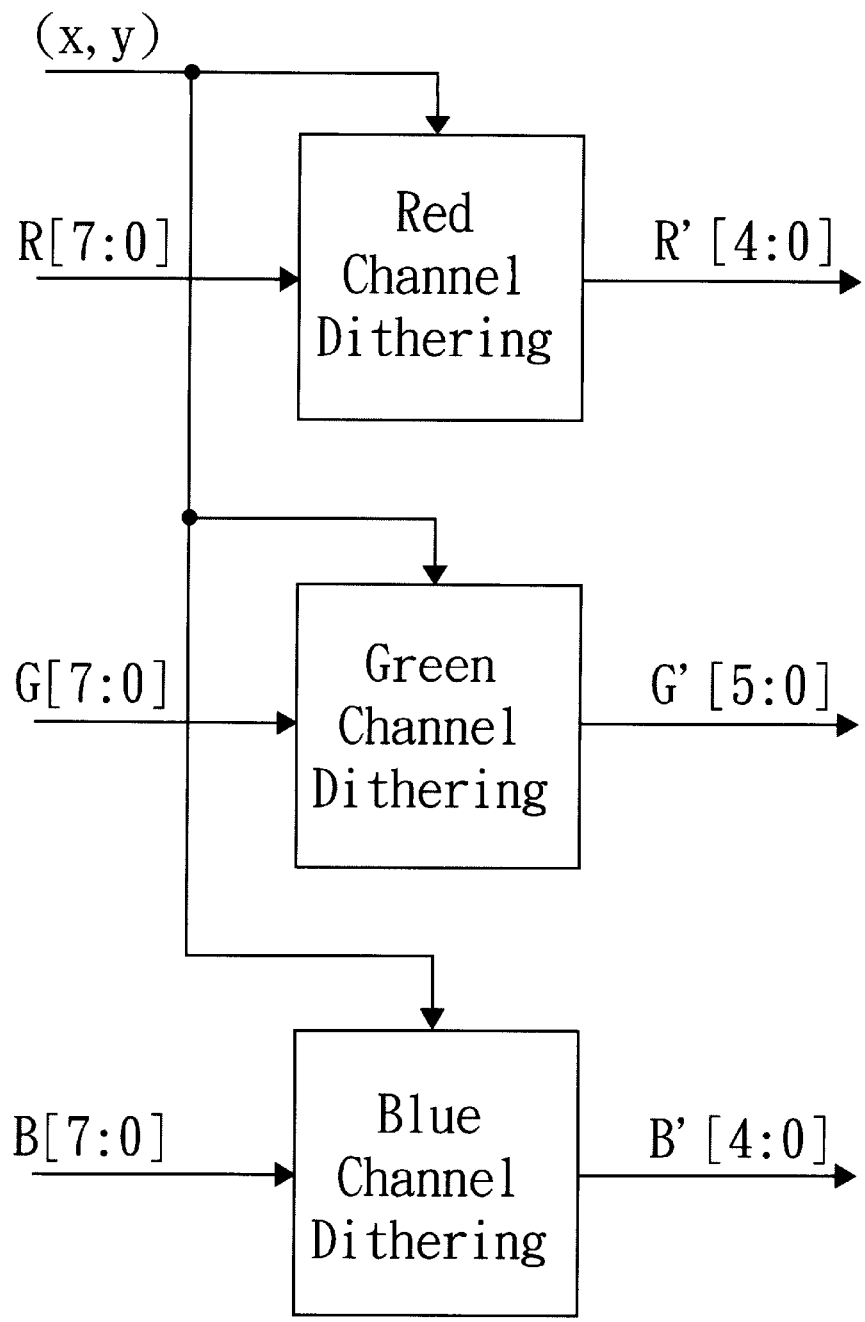
FIG. 1 is a schematic block diagram schematically showing a dithering process for converting a digital image from a true color format to a high color format in computer graphics.
Figure 3:
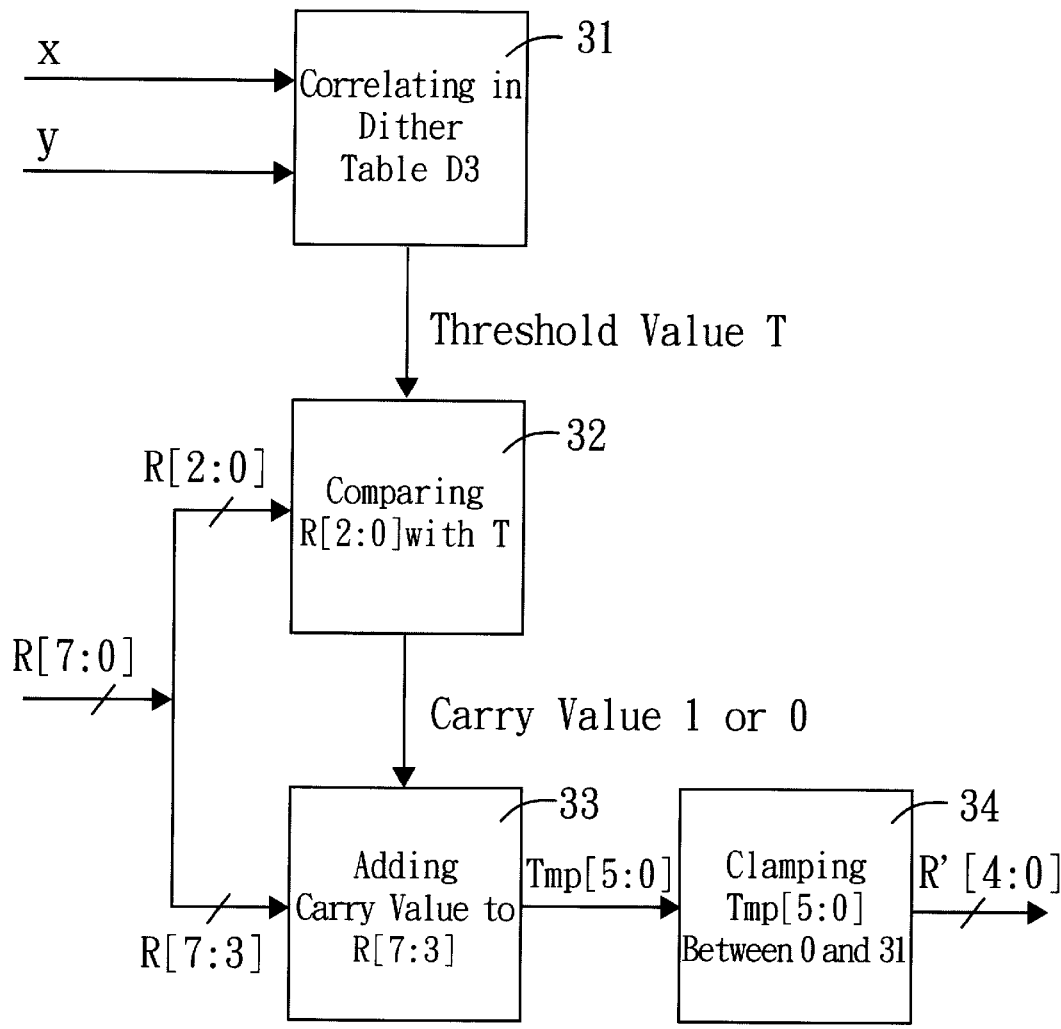
FIG. 3 is a schematic functional block diagram of a conventional dithering process for 8-to-5 conversion of a pixel, as applied to the red color conversion from a true color format to a high color format.
Figure 4:
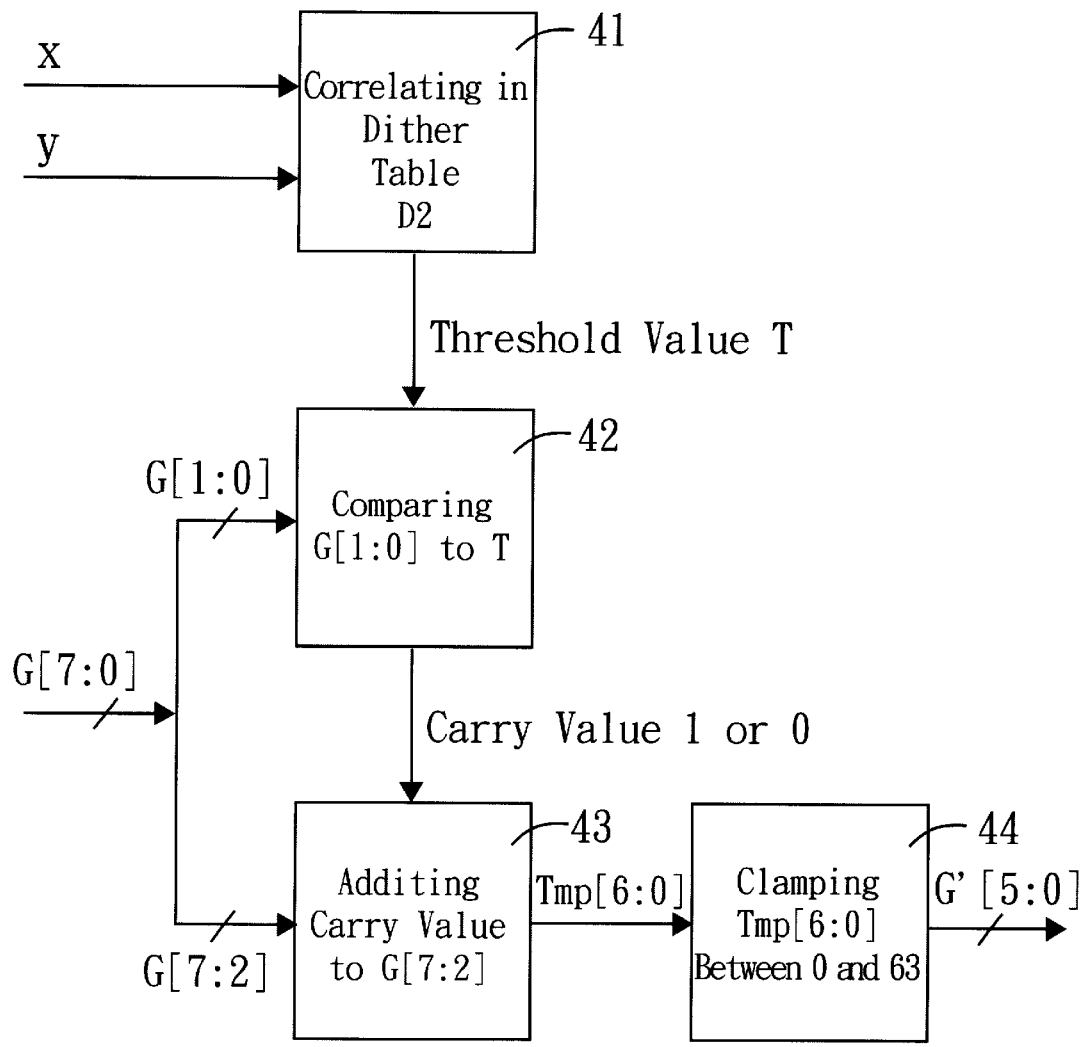
FIG. 4 is a schematic functional block diagram of a conventional dithering process for 8-to-6 conversion of a pixel, as applied to the green color conversion from a true color format to a high color format.
Figure 5A:
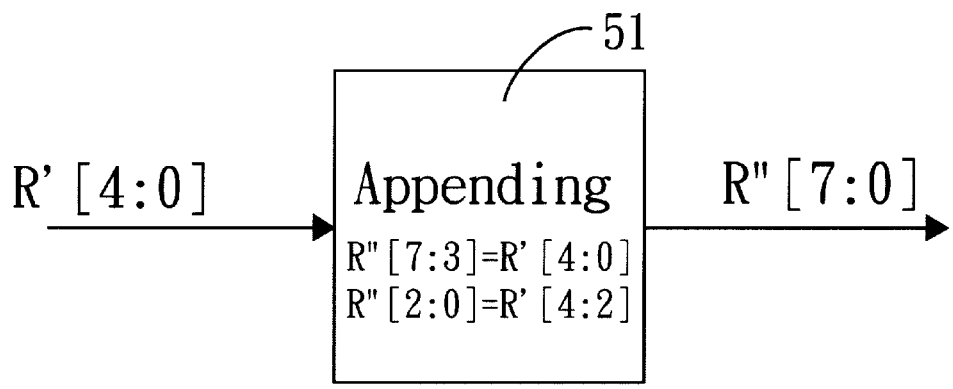
FIGS. 5A and 5B show inverse dithering processes for the dithering processes of FIGS. 3 and 4, respectively.
Figure 5B:
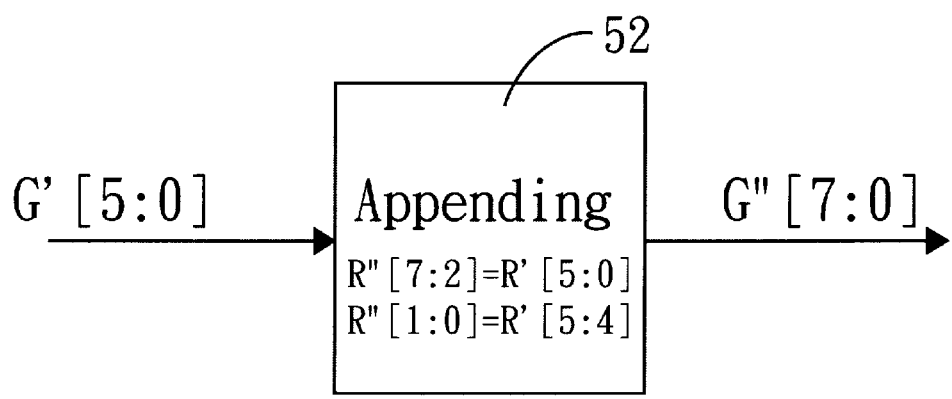

Afterwards, if required, the inverse dithering operation described above with reference to FIG. 5A can be used to recover the image from the high color format to the true color format.

Figure 7:
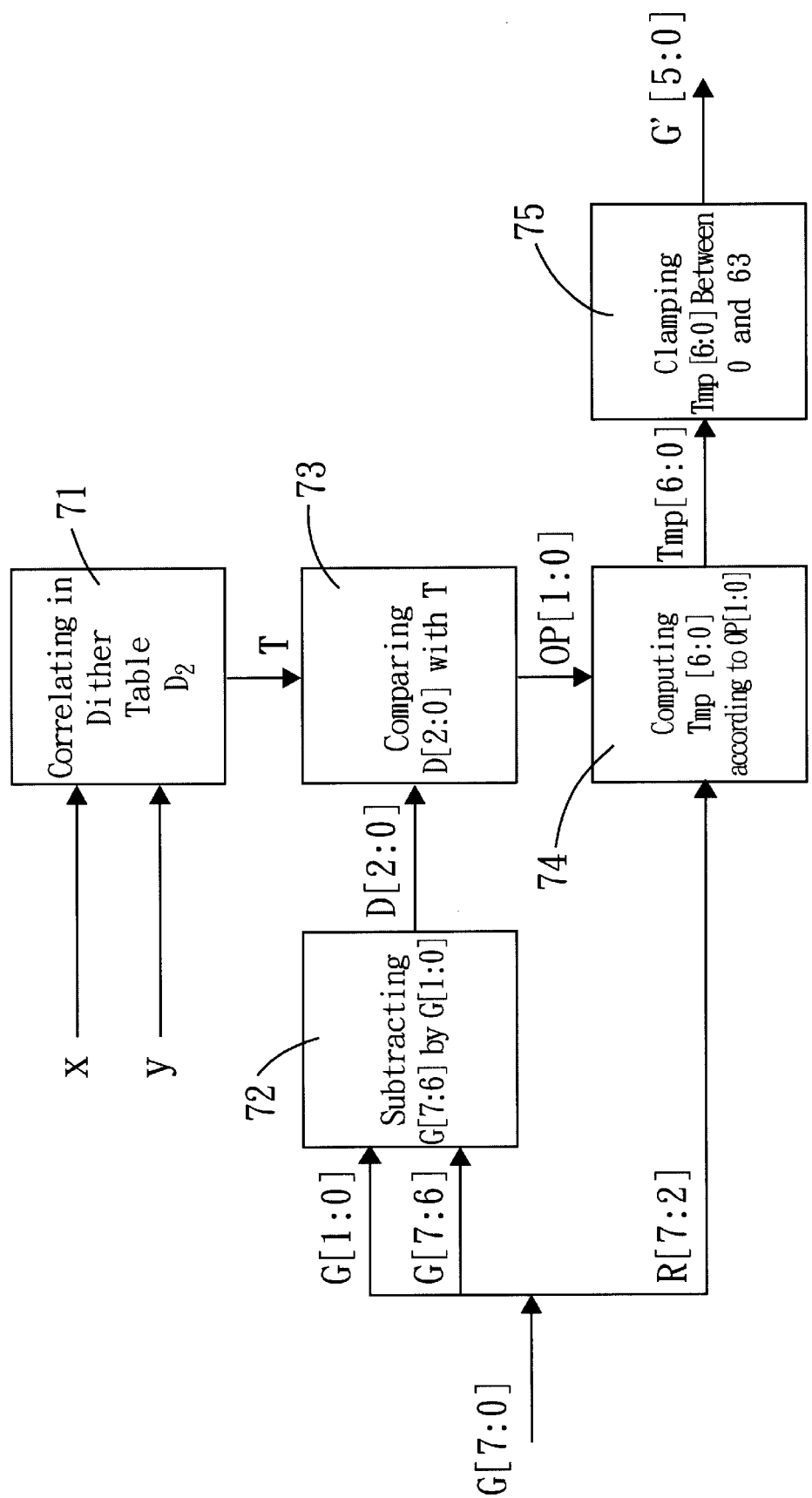
FIG. 7 schematically shows the 8-to-6 conversion of a pixel according to the present method, as applied to the green color conversion from a true color format to a high color format.

FIG. 7 shows how the present dithering process similar to FIG. 6 performs 8-to-6 conversion of a pixel, as applied to the green color conversion from a true color format to a high color format. The coordinate data of the pixel, i.e. x and y, are entered the functional block 71 to correspond to a value in the dither table D2 of FIG. 2A to determine a threshold value T. Meanwhile, the most significant 2 bits G[7:6] and least significant 2 bits G[1:0] of the pixel perform a subtraction operation in the functional block 72 to obtain a difference D[2:0]. A value of the difference D[2:0] is compared with the threshold value T in the functional block 73 to output an operation OP[1:0]. If the absolute value of the difference D[2:0] is less than or equal to the threshold value T, the value of the operation OP[1:0] will be 0, which means no change is needed. Otherwise, if the absolute value of the difference D[2:0] is greater than the threshold value T, the value of the operation OP[1:0] will be set depending on the sign of the difference D[2:0]. The value of the operation OP[1:0] is set to be 1 when the sign of the difference is positive. On the other hand, the value of the operation OP[1:0] is set to be 2 when the sign of the difference D[2:0] is negative. After the value of the operation OP[1:0] has been decided, a temporary value Tmp[6:0] is computed in the functional block 74. The computation process is performed as the following formula:

$$Tmp[6:0] = \begin{cases} G[7:2] & \text{if } OP = 0 \\ G[7:2] + 1 & \text{if } OP = 1 \\ G[7:2] - 1 & \text{if } OP = 2 \end{cases}$$

and the dithered value G' is the result of clamping Tmp[6:0] in the functional block 75 according to the following equation:

$$G'[5:0] = \begin{cases} 63 & \text{if } Tmp[6:0] > 63 \\ 0 & \text{if } Tmp[6:0] < 0 \\ Tmp[6:0] & \text{otherwise} \end{cases}$$

From the above embodiments, it is understood that the invention discloses a dithering method with one of the following conversion criterions: $V_k = V_{k-1} + 1$, $V_k = V_{k-1} - 1$, and $V_k = V_{k-1}$. The inverse dithering process is the same as conventional ones. The dithering method according to the present invention computes the difference of $P_k$ and $H_k$ first, then compares the difference with a threshold value T, and determines that the dithered value should be computed by "plus one", "minus one" or "remain".

For each of the conversion criterions, it is apparent that $P_k=H_k$ due to conventional inverse dithering method. That is, the difference at the k-th dithering process will be 0, i.e. $P_k-H_k=0$. The value 0 will have no chance larger than T, $I_{k+1}$ will be the same as $I_k$, and the dithered error will not be enlarged any more. Thus, the color deviation problem is avoided.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for converting N-bit image data of a digital image into M-bit image data in a dithering process, in which N−M=K, K>0, said method comprising steps of:
    performing a first operation for N-bit image data of a pixel of said digital image to take a difference between the most significant n bits and least significant n bits of said N-bit image data;
    performing a second operation for coordinate data of said pixel to realize a threshold value;
    comparing an absolute value of said difference with said threshold value;
    using the most significant M bits of said N-bit image data of said pixel as new image data of said pixel when said absolute value of said difference is no greater than said threshold value;
    adding a first unit value to said most significant M bits of said N-bit image data of said pixel to serve as new image data of said pixel when said absolute value of said difference is greater than said threshold value, and a sign of said difference value is positive; and
    subtracting a second unit value from said most significant M bits of said N-bit image data of said pixel to serve as new image data of said pixel when said absolute value of said difference is greater than said threshold value, and said sign of said difference value is negative, whereby said N-bit image data of said pixel is converted into M-bit image data.

2. The method according to claim 1 wherein $1 \leq n \leq (N/2)$.

3. The method according to claim 1 wherein n=K.

4. The method according to claim 1 wherein said first unit value is one, and said second unit value is one.

5. The method according to claim 1 further comprising a step of comparing a sum of said most significant M bits of said N-bit image data and said first unit value with a value $(2^M-1)$, and using said value $(2^M-1)$ as said new image data of said pixel when said sum is greater than $(2^M-1)$.

6. The method according to claim 1 further comprising a step of comparing a difference of said most significant M bits of said N-bit image data and said second unit value with a value 0, and using said value 0 as said new image data of said pixel when said difference is less than 0.

7. The method according to claim 1 wherein said first operation includes a subtraction operation.

8. The method according to claim 1 wherein said second operation includes a dithering operation.

9. The method according to claim 1 wherein said image data of said pixel is one selected from a group consisting of red, green and blue color values of said pixel.

10. The method according to claim 9 wherein said steps are repeated for the other pixels of said digital image to complete conversion of said N-bit image data of said digital image into said M-bit image data.

11. An apparatus for performing a dithering process to convert N-bit image data of a digital image into M-bit image data in which N−M=K, K>0, said apparatus comprising:
    a subtraction operator for subtracting the most significant n bits of said N-bit image data by least significant n bits of said N-bit image data to obtain a difference;
    a threshold operator for operating coordinate data of said pixel to obtain a threshold value;
    a comparing operator electrically connected to said subtraction operator and said threshold operator for comparing said difference with said threshold value, said comparing operator outputting a first control signal when an absolute value of said difference is no greater than said threshold value, a second control signal when said absolute value of said difference is greater than said threshold value, and a sign of said difference value is positive, and a third control signal when said absolute value of said difference is greater than said threshold value, and a sign of said difference value is negative; and
    a computing operator electrically connected to said comparing operator for outputting said most significant M bits of said N-bit image data of said pixel as new image data with M bits of said pixel in response to said first control signal, outputting said most significant M bits plus a first unit value as said new image data of said pixel in response to said second control signal, and outputting said most significant M bits minus a second unit value as said new image data of said pixel in response to said third control signal;
    whereby said N-bit image data of said pixel is converted into M-bit image data.

12. The apparatus according to claim 11 further comprising a clamp operator electrically connected to said computing operator for comparing a value of said new image data of said pixel with a value $(2^M-1)$ and a value 0, and performing a first adjusting operation for said M-bit image data having said value greater than said value $(2^M-1)$, and a second adjusting operation for said M-bit image data having said value less than said value 0.

13. The apparatus according to claim 12 wherein said first adjusting operation is performed by substituting said value $(2^M-1)$ for said compared M-bit image data to become said new image data of said pixel.

14. The apparatus according to claim 12 wherein said second adjusting operation is performed by substituting said value 0 for said compared M-bit image data to become said new image data of said pixel.

15. The apparatus according to claim 11 wherein said threshold operator includes therein a dither table for corresponding said coordinate data of said pixel to said threshold value.

16. The apparatus according to claim 11 wherein $1 \leq n \leq (N/2)$.

17. The apparatus according to claim 11 wherein n=K.

18. The apparatus according to claim 11 wherein said first unit value is one, and said second unit value is one.

19. The apparatus according to claim 11 wherein said image data of said pixel is one selected from a group consisting of red, green and blue color values of said pixel.

* * * * *